United States Patent [19]
Katsumata et al.

[11] Patent Number: 5,181,110
[45] Date of Patent: Jan. 19, 1993

[54] VIDEO SIGNAL PROCESSING CIRCUIT CAPABLE OF ENLARGING AND DISPLAYING A PICTURE

[75] Inventors: Kenji Katsumata; Shigeru Hirahata; Masato Sugiyama; Takaaki Matono, all of Yokohama; Kazuo Ishikura, Kanagawa; Sunao Suzuki, Kamakura; Kazuhiro Kaizaki, Yokohoma, all of Japan

[73] Assignees: Hitachi, Ltd., Tokyo; Hitachi Video Engineering Inc., Kanagawa, both of Japan

[21] Appl. No.: 634,518

[22] Filed: Dec. 27, 1990

Related U.S. Application Data

[63] Continuation of Ser. No. 343,495, Apr. 25, 1989, Pat. No. 5,029,006.

[30] Foreign Application Priority Data

Apr. 25, 1988 [JP] Japan .................... 63-100328

[51] Int. Cl.$^5$ .............................................. H04N 5/00
[52] U.S. Cl. ...................................... 358/140; 358/180
[58] Field of Search ................ 358/140, 160, 451, 22, 358/180

[56] References Cited

U.S. PATENT DOCUMENTS

| | | | |
|---|---|---|---|
| 4,496,974 | 1/1985 | Heitmann | 358/140 |
| 4,528,585 | 7/1985 | Bolger | 358/180 X |
| 4,636,857 | 1/1987 | Achiha et al. | 358/140 |
| 4,774,581 | 9/1988 | Shiratsuchi | 358/451 X |
| 4,853,765 | 8/1989 | Katsumata et al. | 358/140 X |
| 4,866,520 | 9/1989 | Nomura et al. | 358/140 |

Primary Examiner—James J. Groody
Assistant Examiner—Mark R. Powell
Attorney, Agent, or Firm—Antonelli, Terry, Stout & Kraus

[57] ABSTRACT

A video signal processing circuit capable of enlarging and displaying a picture and adapted for use in an apparatus in which a desired picture is selected, and a video signal representative of the desired picture under interlaced scanning is received, stored in a memory and processed to provide an enlarged video signal, includes a real signal/interpolated signal preparation circuit for preparing, from the stored video signal, new scanning lines for an image to be enlarged, and a memory processing circuit having switching control function to store an output signal of the real signal/interpolated signal preparation circuit in a memory, read the video signal out of the memory at a period different from a period at which the output signal is stored in the memory, and delay a read-out signal by one or more fields so that an enlarged signal is delivered.

7 Claims, 17 Drawing Sheets

FIG. 3A PRIOR ART

| FIELD NO. | SCANNING LINE NO. | Y ADDRESS |
|---|---|---|
| 1 | 1 | 00 |
| 2 | 1 | 01 |
| 1 | 2 | 02 |
| 2 | 2 | 03 |
| 1 | 3 | 04 |
| 2 | 3 | 05 |
| 1 | 4 | 06 |
| 2 | 4 | 07 |
| 1 | 5 | 08 |
| 2 | 5 | 09 |
| 1 | 6 | 0A |
| 2 | 6 | 0B |
| ... | ... | ... |

FIG. 3B PRIOR ART

| FIELD NO. | SCANNING LINE NO. | Y ADDRESS |
|---|---|---|
| 1 | 1 | 00 |
| 2 | 1 | 00 |
| 1 | 2 | 00 |
| 2 | 2 | 00 |
| 1 | 3 | 01 |
| 2 | 3 | 01 |
| 1 | 4 | 01 |
| 2 | 4 | 01 |
| 1 | 5 | 02 |
| 2 | 5 | 02 |
| 1 | 6 | 02 |
| 2 | 6 | 02 |
| ... | ... | ... |

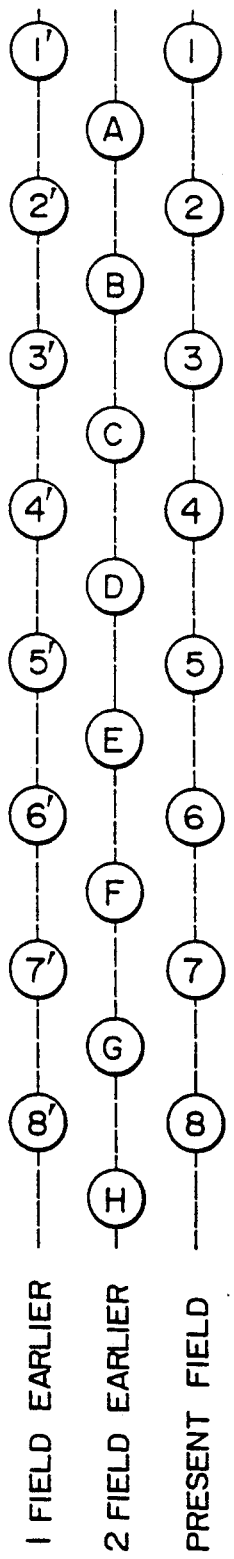
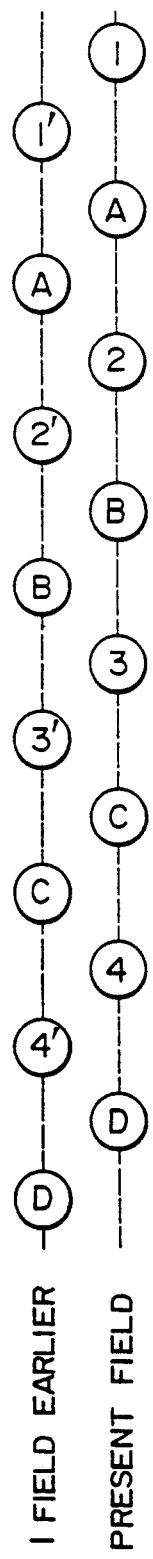
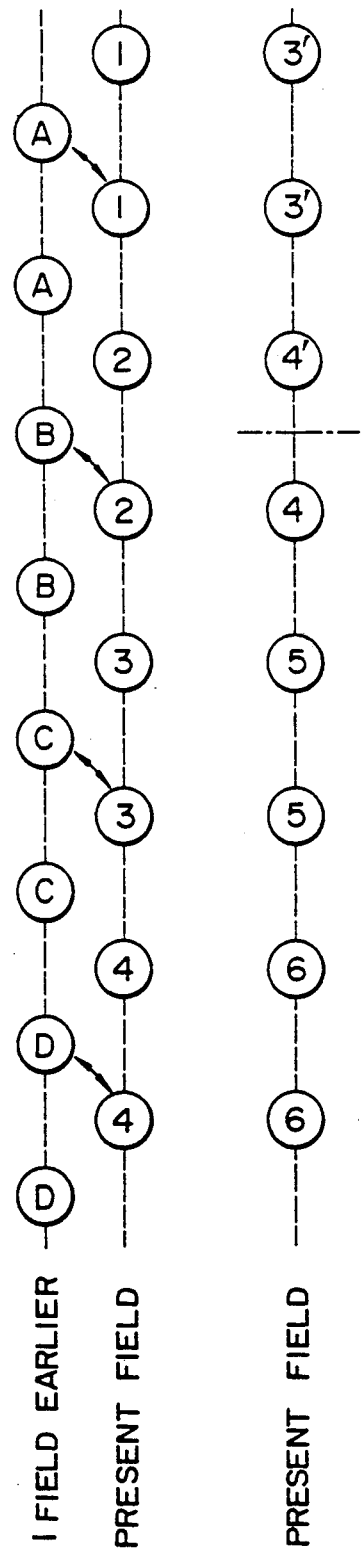
FIG. 4A  FIG. 4B  FIG. 4C  FIG. 4D

FIG. 5A　　FIG. 5B　　FIG. 5C　　FIG. 5D
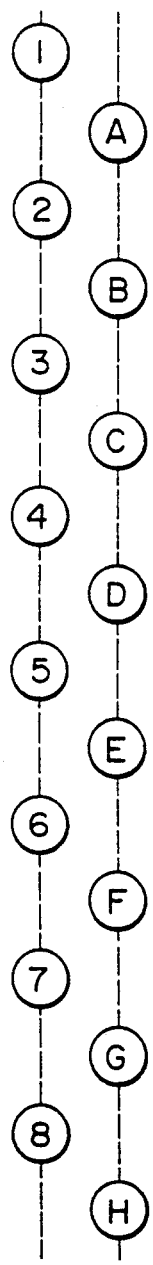
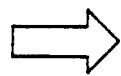
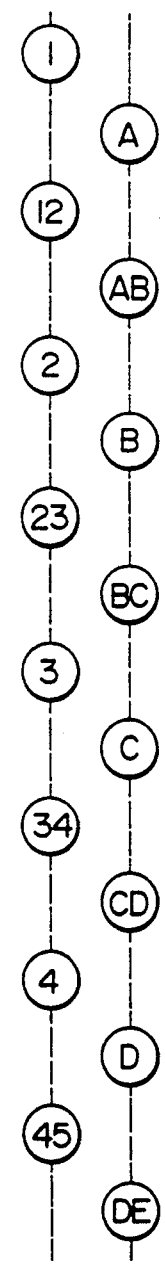
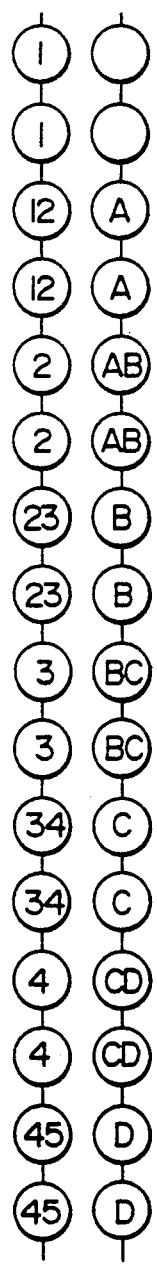
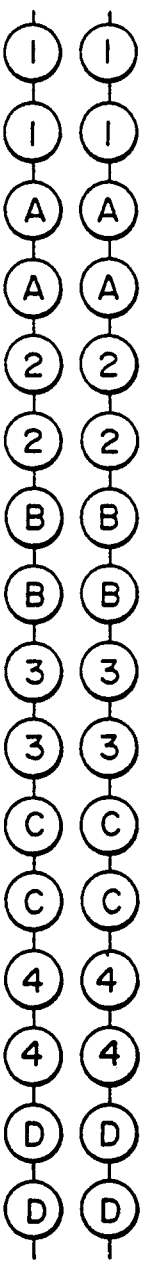

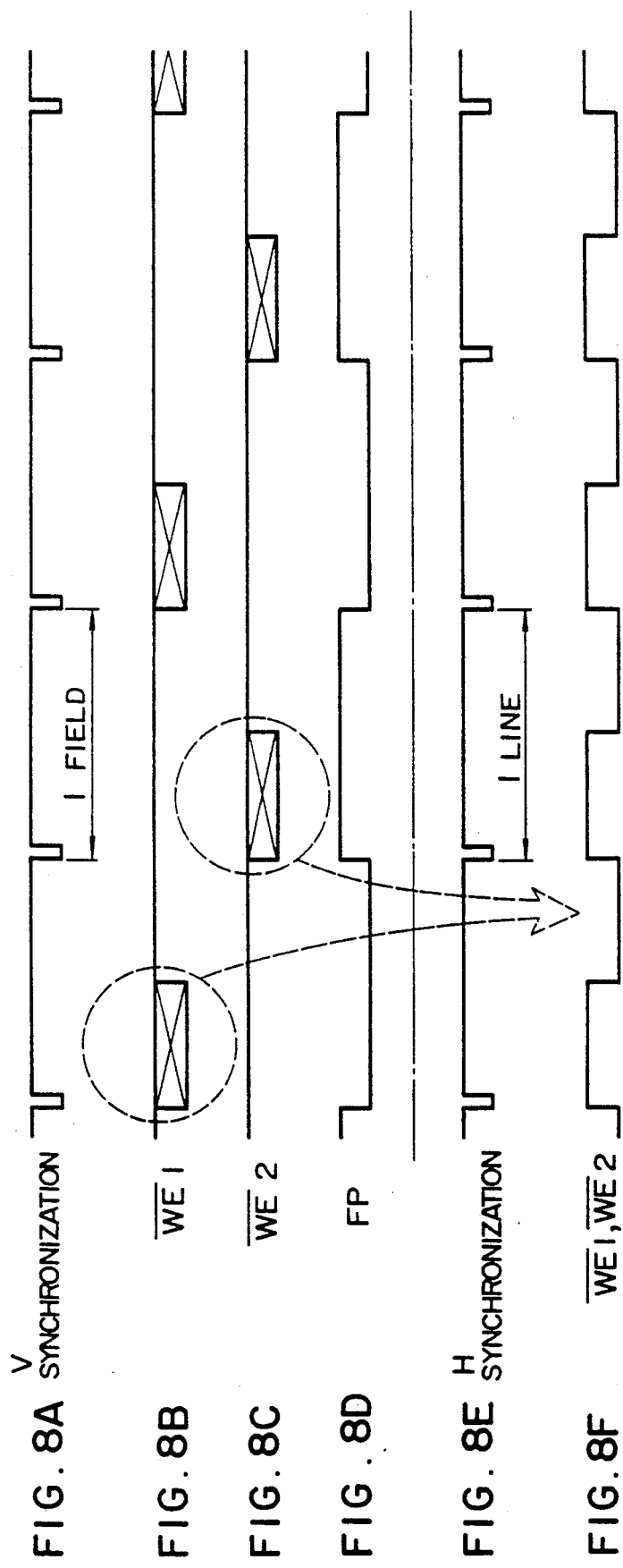

INCOMING PICTURE

STORAGE AREA OF MEMORY

ENLARGEMENT POSITION

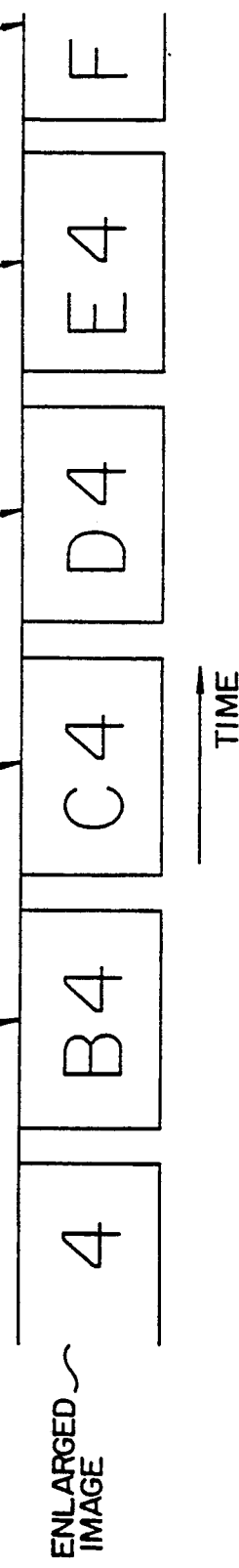

VIDEO SIGNAL PROCESSING CIRCUIT CAPABLE OF ENLARGING AND DISPLAYING A PICTURE

This is a continuation of Ser. No. 343,495 filed Apr. 25, 1989, now U.S. Pat. No. 5,029,006.

BACKGROUND OF THE INVENTION

This invention relates to apparatus for processing digitized video signals used in apparatus such as color television, VCR, video disk player (VDP), video printer or image transmission apparatus and more particularly to a video signal processing circuit suitable for enlarging and displaying video signals.

Digital signal processing techniques have been introduced into electric home appliances, making it possible to perform various special display functions even in apparatus such as TV, VTR and VDP. For example, picture still, segmental picture display and the like have already been commercialized. Recently, as shown in JP-A-61-149987, function to effect enlargement on the TV screen has been developed. In the aforementioned known example, pictures corresponding to various inputs can be n times enlarged in the vertical direction.

The enlarging method of the aforementioned known example will now be described with reference to FIG. 2. In FIG. 2, 201 designates a horizontal synchronization signal generation circuit, 202 an enlargement coefficient setting circuit for setting a magnification of enlargement, 203 a counter for counting the horizontal synchronization signal in accordance with the magnification of enlargement, 204 a selector for switching between the horizontal synchronization pulse for normal reproduction and that for enlargement, 205 a field discriminator, 206 a clock delay circuit for generating horizontal synchronization pulses under interlaced scanning in accordance with the magnification of enlargement and a field to be enlarged, 207 a clock control circuit for dividing the horizontal synchronization signal into two in the mode of normal reproduction under interlaced scanning, 208 a selector for selecting between the horizontal synchronization pulse in accordance with a structure of the input signal and a control signal for enlarged display of normal display, 209 a vertical address counter, 210 a horizontal address counter, 211 an adder for synthesizing vertical and horizontal addresses, 212 an image memory for storing an image to be enlarged, and 213 an image output terminal. In the known example, the counter 203, clock delay circuit 206 and clock control circuit 207 prepare, in accordance with the magnification of enlargement and the structure of the input signal, horizontal synchronization pulses to be inputted to the luminance (Y) address counter 209 in order that vertical addresses on the image memory 212 be so changed as to produce an enlarged image. For example, under the interlaced scanning of the input signal, vertical addresses are as shown in FIG. 3A in the case of normal display but in the case of 4-times enlargement, vertical addresses are as shown in FIG. 3B. In the case of the normal display under interlaced scanning, the vertical address increases through 00, 02, 04 . . . in the first field and through 01, 03, 05 . . . in the second field. If in this case images of the first field are stored at even addresses in the image memory 212 and images of the second field at odd addresses, accurate reproduction can be effected. On the other hand, in the case of the enlarged display, the vertical address increases through 00, 00, 01, 01, 02, 02 . . . in the first field and advances through 00, 00, 01, 01, 02, 02 . . . also in the second field. Accordingly, an identical image can be reproduced over four lines in the vertical direction to permit a 4 times enlarged display.

In the aforementioned prior art, the image is enlarged by changing the address on the image memory in accordance with the configuration of the input signal and the magnification of enlargement and a correctly enlarged display can be effected when a still picture is stored in the image memory. However, when the enlargement of display according to FIG. 3B is carried out in connection with display of a moving picture as in the case of TV, signals of even addresses indicative of images inherently belonging to the first field and signals of odd addresses indicative of images inherently belonging to the second field are subjected to display within the same first field, with the result that a comb-tooth like image is displayed, producing an unnatural picture.

The state of this disturbance will be described in greater detail with reference to FIGS. 4A to 4D. FIGS. 4A to 4D show the structure of scanning line in the mode of enlargement. FIG. 4A shows an incoming video signal. Scanning lines as viewed exactly laterally thereof are illustrated by circles, and individual scanning lines are named after alphabet and numerical numbers indicated in the circles on the assumption that a field indicated by numerical numbers is the present field, a field indicated by alphabet one field precedes the present field and a field indicated by numerical numbers hatted with dash two fields precedes the present field. FIGS. 4B and 4C show scanning line structures obtained when an image based on scanning lines shown in FIG. 4A is twice enlarged and displayed. FIG. 4B shows an instance where the image is enlarged and displayed according to the method of the aforementioned known example. In the instance shown in FIG. 4B, scanning lines of different fields are subjected to display within the same field and as a result, the comb-tooth like disturbance occurs in a moving picture. To solve this problem, signals of the present field are prepared using incoming signals of the present field and signals of the one-preceding field are prepared using signals of the one-preceding field, providing the structure shown in FIG. 4C. In this case, however, inversion of scanning line position occurs between scanning lines indicated by arrows and turns into disturbance.

In enlargement of a moving picture, even for a display of the same field, the corresponding image stored in the memory sometimes bridges two fields depending on the position on the screen at which the enlargement occurs and picture pattern displacement takes place between upper and lower portions of the image. In the aforementioned prior art example, enlargement at a lower portion of the screen can be effected by changing the initial value of the Y address counter 209. FIG. 4D shows an instance where a portion following the third line is enlarged. In FIG. 4D, lines (above the chained line) of an upper portion are constructed of signals of the two-preceding field and lines of the lower portion are constructed of signals of the present field. Thus, signals of different fields are displayed within the same field, resulting in an unnatural picture.

As described above, the prior art fails to consider enlargement of a moving picture under interlaced scanning such as ordinary television signals and faces problems:

(1) Comb-tooth like disturbance takes place in the image.

(2) Displacement of image takes place between upper and lower portions of the screen.

SUMMARY OF THE INVENTION

An object of this invention is to provide an accurately enlarged, high-quality image even in a moving picture.

To accomplish the above object, according to one feature of the invention, an apparatus for performing enlarged display by changing the period at which a television signal is written in a memory from the period at which the television signal is read out of the memory, comprises a circuit for preparing, from an input video signal, a real scanning line signal and an interpolated scanning line signal, first and second buffer memories each having a capacity of more than ¼ field for storing the real scanning line signal, third and fourth field memories each having a capacity of more than ¼ field for storing the interpolated scanning line signal, a first switch circuit for switching outputs of the first and second buffer memories, a second switch circuit for switching the third and fourth buffer memories, and a third switch circuit for switching the first and second switch circuits.

A unit for performing progressive screen display comprises a progressive screen conversion circuit which precedes or succeeds the third switch circuit.

According to another feature of the invention, an apparatus provided with a luminance and chrominance (Y/C) separation circuit having a memory for at least one frame delaying a television signal and a scanning line interpolation circuit having a memory for one field delaying the Y/C separation circuit comprises a first delay circuit for delaying the output of the output of the Y/C separation circuit, a second delay circuit for delaying the scanning line interpolation circuit, a fourth switch circuit for switching the first delay circuit and the input television signal and applying a resulting signal to the frame memory, a fifth switch circuit for switching the second delay circuit and the output of the Y/C separation circuit and applying a resulting signal to the field memory, a sixth switch circuit for switching outputs of the Y/C separation circuit and frame memory, a seventh switch circuit for switching outputs of the field memory and scanning line interpolation circuit, an eighth switch circuit for switching outputs of the sixth switch circuit and seventh switch circuit, and a line buffer succeeding the eighth switch circuit.

In the unit for performing progressive scan display, there is provided a progressive scan conversion circuit which precedes or succeeds the eighth switch circuit.

The first and second buffer memories alternately store the real scanning line signals field by field and the third and fourth buffer memories alternately store the interpolated scanning line signals field by field. For example, at the phase of a field within which writing of the first and third buffer memories proceeds, a signal of one-preceding field is read out of the second and fourth buffer memories and delivered through the first and second switch circuits. At the phase of a field within which writing of the second and fourth buffer memories proceeds, a signal of one-preceding field is read out of the first and third buffer memories and delivered through the first and second switch circuits. Accordingly, the signal of one-preceding field can be displayed to solve the aforementioned problem (2) that different fields are displayed on upper and lower portions of the screen. By switching the outputs of the first and second switch circuits by means of the output of the third switch circuit, an enlarged image of a moving picture can always be displayed using a signal within one field to solve the aforementioned problem (1) of the comb-tooth like disturbance.

In the system for progressive scan display, the output of the first switch circuit standing for the real scanning line signal and the output of the second switch circuit standing for the interpolated scanning line signal are inputted to the progressive scan conversion circuit to thereby effect progressive scan display.

In the system provided with the Y/C separation circuit having a frame memory and the scanning line interpolation circuit having a field memory, a signal after Y/C separation processing is fed back through the first delay circuit and fourth switch circuit to an empty area on the frame memory and written therein, and a signal after scanning line interpolation processing is fed back through the second delay circuit and fifth switch circuit to an empty area on the field memory and written therein. By using the frame memory and field memory in place of the first, second, third and fourth buffer memories in this manner, the problems of the prior art example can be solved.

The principle of enlarging processing of the invention will now be described in greater detail. The problems of the prior art example reside in two points of (1) the occurrence of comb-tooth like disturbance in a moving picture, and (2) displacement of a moving image between upper and lower portions of the screen, and the method of solving the problems includes two points of (1) the provision of the scanning line interpolation circuit, and (2) display of images of more than one-preceding fields.

The method of solving the first problem will first be described briefly. When an interpolated scanning line preparation circuit is used which prepares new scanning lines from adjacent scanning line signals so as to carry out enlargement, there occur scanning line structures as shown in FIGS. 5A to 5D. Here, a scanning line name 12 implies a signal generated from scanning lines 1 and 2 and a scanning line AB implies a scanning line generated from scanning lines A and B. FIG. 5B shows a scanning line structure for a standard scan display and FIG. 5C a scanning line structure for progressive scan display.

In this case, the comb-tooth like disturbance and inversion of scanning line taking place in FIGS. 4B and 4C do not occur and a correctly enlarged image can be obtained, thus solving the first problem.

Further, it is considered that a motion adaptive scanning line interpolation circuit is introduced to prepare new scanning lines from a signal of one-preceding field when the incoming signal is of a still picture but from upper and lower scanning lines when the incoming signal is of a moving picture. In this case, for the incoming signal being of a still picture, a scanning line 12 turns into a scanning line A and a scanning line AB turns into a scanning line 2. Accordingly, at the phase of still picture, the scanning line structure is as shown in FIG. 4B but at the phase of moving picture, the scanning line structure is as shown in FIG. 5B, thereby ensuring that disturbance can always be avoided and an enlarged image of high quality can be obtained.

When an enlargement processing circuit provided with the motion adaptive scanning line interpolation circuit is applied to the unit for progressive scan display, quality of an enlarged image can be improved further for a still picture and a moving picture.

The method of solving the second problem will now be described. A description will be given by way of progressive scan display with reference to FIGS. 6A to 6C. FIG. 6A shows an incoming image and FIG. 6B shows a scanning line structure obtained when the third line and ensuing lines are simply enlarged. Then, because a scanning line 3 has not arrived yet upon start of display, a scanning line 3' preceding by one frame is displayed at the position where the scanning line 3 should inherently be displayed, resulting in a display of an unnatural picture. Then, the buffer memory is provided to permit an image of one-preceding field to be displayed and there results FIG. 6C, indicating that a signal displayed is of the one-preceding field but signals of different fields are not displayed on the same screen display to provide a natural, enlarged image.

Capacity of the buffer memory depends on magnification of enlargement and for two-times or more enlargement, it is sufficient that two buffer memories each having a capacity of more than ¼ field at the most are provided for each of the real scanning line and interpolated scanning line. To minimize the capacity of the buffer memory, the buffer memory must be designed to store only a portion which is displayed as an enlarged image. When four corners and the central portion of the screen are to be twice enlarged, portions of an image to be enlarged which are to be stored are as shown in FIGS. 7A to 7E, indicating that storage of only hatching portions in the buffer memories suffices.

BRIEF DESCRIPTION OF THE DRAWINGS

FIGS. 3A and 3B are diagrams for explaining an enlargement method in the prior art example;

FIGS. 4A to 4D, FIGS. 5A to 5D and FIGS. 6A to 6C are diagrams respectively showing scanning line structures in the mode of enlargement;

FIGS. 8A to 8F are timing charts for memory control signals;

FIGS. 15A to 15E and FIGS. 16A to 16D are conceptive diagrams for explaining enlargement processings of pictures, respectively;

DETAILED DESCRIPTION OF EMBODIMENTS

A method of enlarging a picture will now be described by referring to a specific embodiment.

Figure 1:
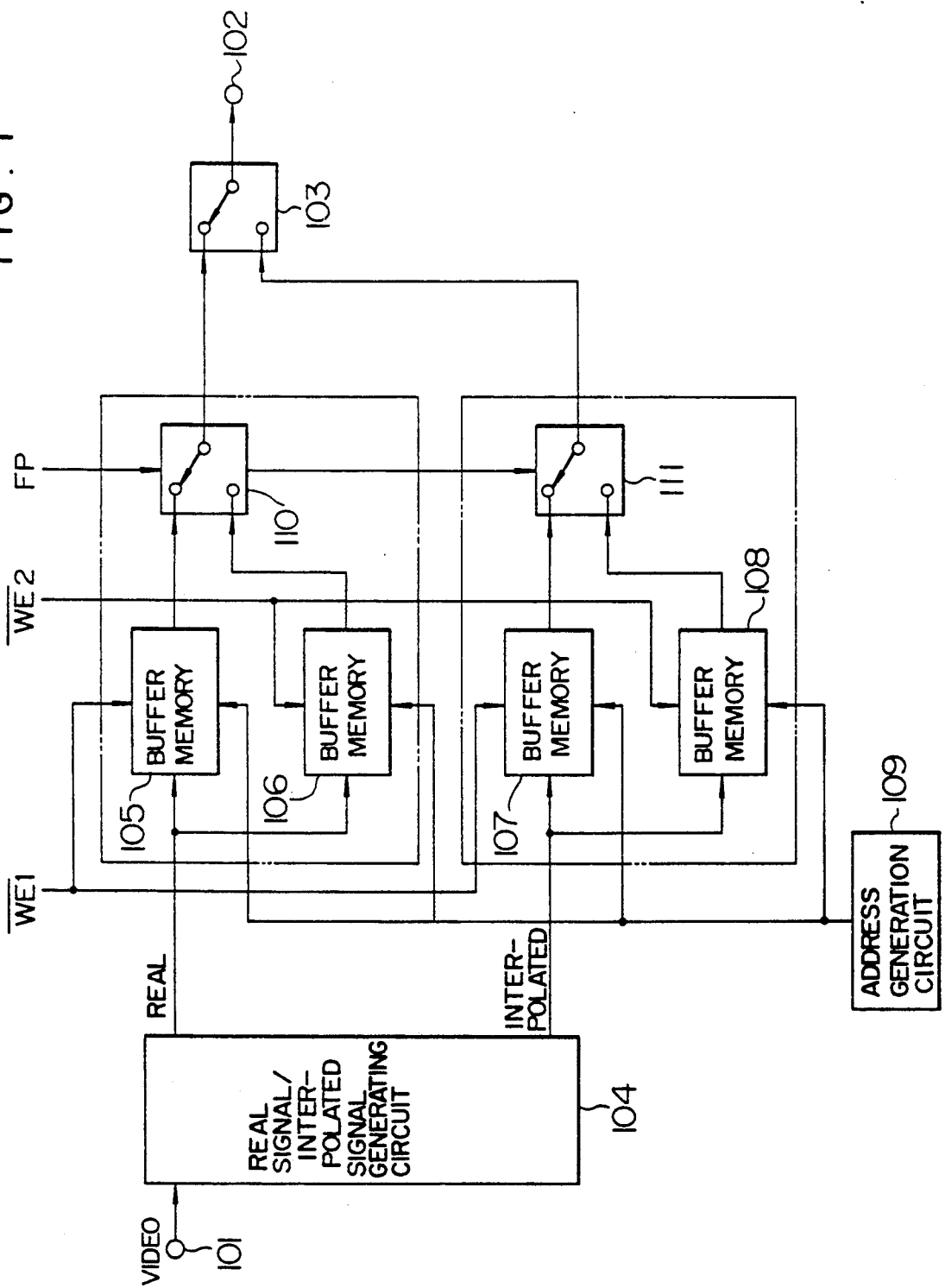
FIG. 1 is a block diagram showing an embodiment of the invention.
Figure 2:
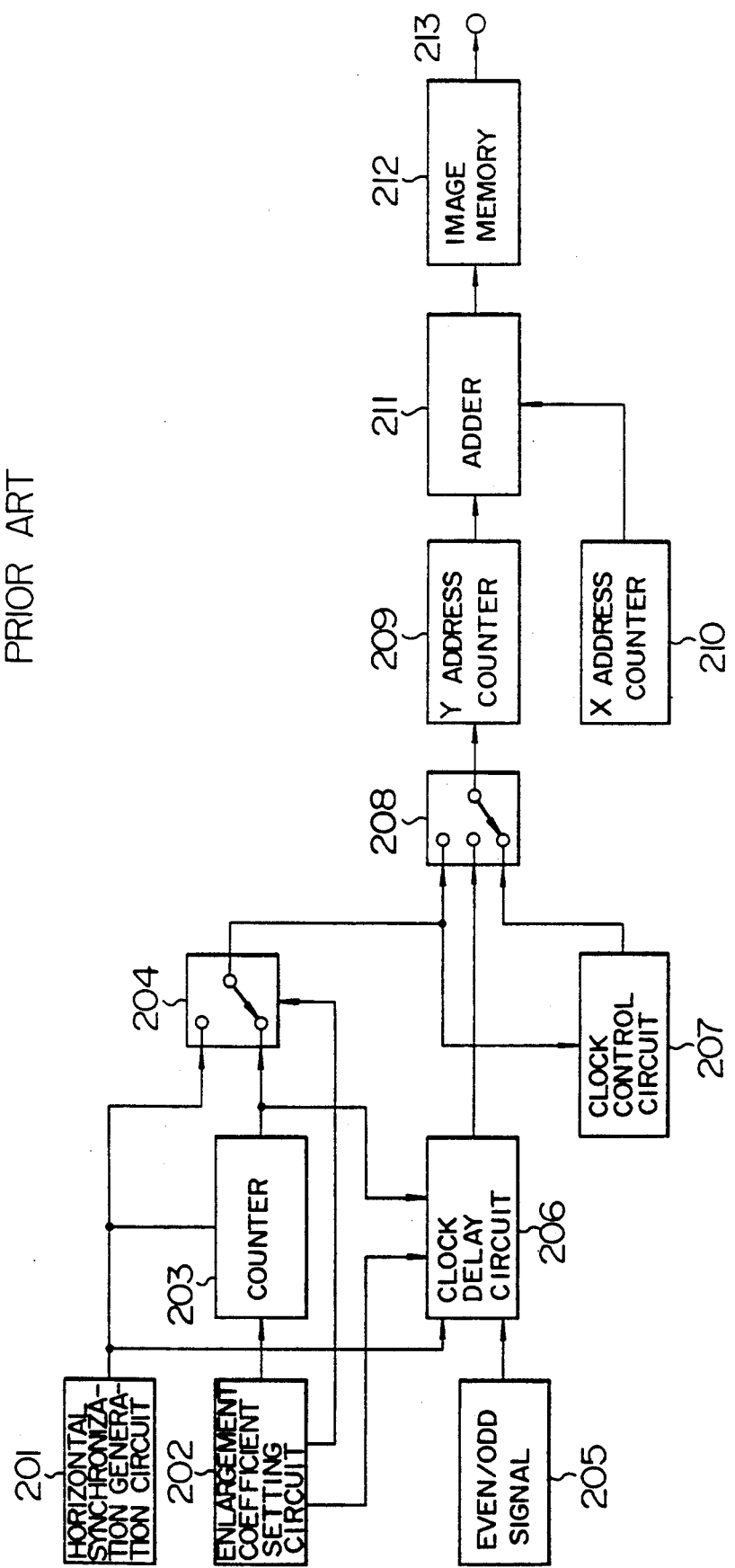
FIG. 2 is a block diagram showing a prior art example.
Figure 6A:
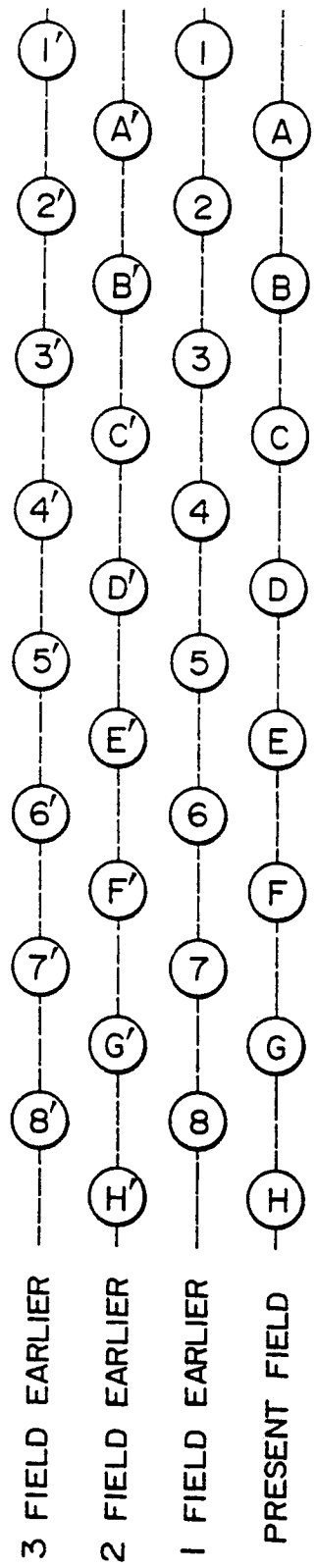
Figures 6B, 6C:
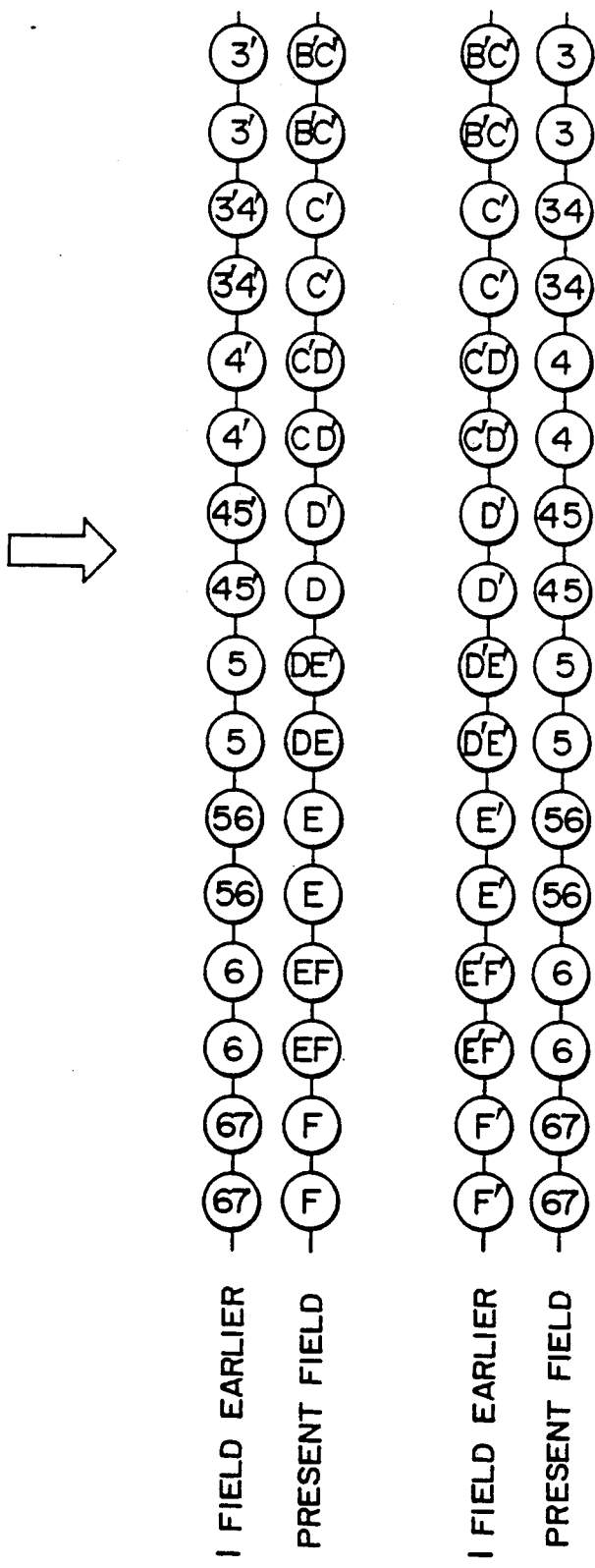

An embodiment of the invention will be described with reference to FIG. 1. In FIG. 1, 101 designates an input terminal for a video signal, 102 an output terminal for an image, 104 a real signal/interpolated signal generating circuit for preparing a real scanning line signal and an interpolated scanning line signal on the basis of the video signal from the input terminal 101, 105 and 106 first and second buffer memories for storing the real scanning line signal, 107 and 108 third and fourth buffer memories for storing the interpolated scanning line signal, 109 an address generation circuit for applying write/read addresses to the first, second, third and fourth buffer memories 105, 106, 107 and 108, 110 a first switch circuit for selecting one of output signals of the first and second buffer memories 105 and 106, 111 a second switch circuit for selecting one of output signals of the third and fourth buffer memories 107 and 108, and 103 a third switch circuit for switching output signals of the first and second switch circuits.

Scanning line structures in this embodiment are shown in FIGS. 5A to 5D and timings for principal signals are shown in FIGS. 8A to 8F.

Figure 7A:
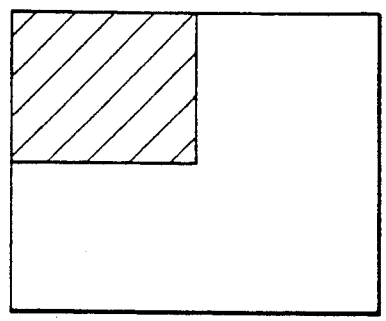
FIGS. 7A to 7E are conceptive diagrams showing positions on the screen at which enlargement occurs.
Figure 7B:
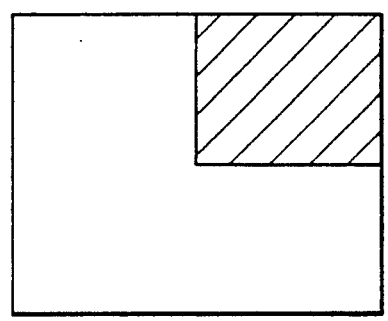
Figure 7C:
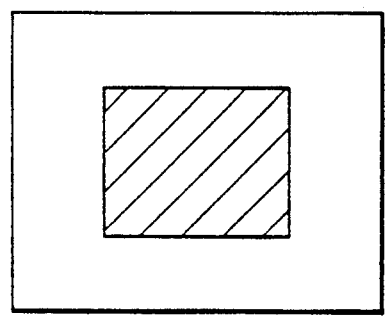
Figure 7D:
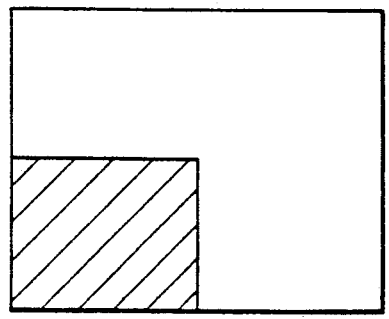
Figure 7E:
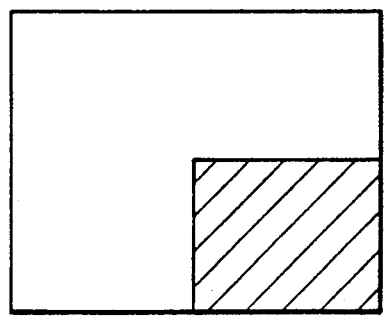

Referring to FIG. 1, in the real signal/interpolated signal preparation circuit 104, an actual scanning line signal such as scanning line 1 or scanning line A and an interpolated scanning line signal such as scanning line 12 or scanning line AB in FIG. 5B are prepared from the video signal inputted through the input terminal 101 and they are supplied to the first, second, third and fourth buffer memories 105, 106, 107 and 108. The actual scanning line signal and interpolated scanning line signal are respectively written in the first and third buffer memories 105 and 107 in accordance with a write control signal ($\overline{WE}$ 1) shown in FIGS. 8B and 8F and in the second and fourth buffer memories 106 and 108 in accordance with a write control signal shown in FIGS. 8C and 8F. It is to be noted that control signals shown in FIGS. 8A to 8F are used for two-times enlargement at the upper right position as shown in FIG. 7B and signals in dotted-line circles are broken down by being expanded at the horizontal period as shown in FIG. 8F.

Signals stored in the buffer memories 105, 106, 107 and 108 are repetitively read in the form of a batch of two lines in accordance with read addresses from the address generation circuit 109 in order to effect enlargement in the vertical direction. Enlargement in the horizontal direction can be realized by applying twice the same address or halving the frequency of the read clock. The first and second switch circuits 110 and 111 are controlled by a pulse (FP) which is switchable every field as shown in FIG. 8D, so that within a field in which signals are written in the first and third buffer memories 105 and 107, signals read out of the second and fourth buffer memories 106 and 108 are delivered and within another field in which signals are written in the second and fourth buffer memories 106 and 108, signals read out of the first and third buffer memories 105 and 107 are delivered. A signal ($\overline{OE}$) for inhibiting the first, second, third and fourth buffer memories 105, 106, 107 and 108 from being read may play the part of the first and second switch circuits 110 and 111. According to a control method using the address generation circuit 109 and the WE and OE signals, a portion inside a dotted-line block shown in FIG. 1 may be constructed of a single buffer memory. The real scanning line signal and interpolated scanning line signal obtained through the above method are switched and delivered by means of the switch circuit 103 in the case of standard scan display but in the case of progressive scan display, subjected to noninterlace scanning by means of a progressive scan conversion circuit (to be described later), thereby providing accurate enlarged images as shown in FIGS. 5B to 5D.

The third problem in the aforementioned known example is that the additional provision of the image memory 212 is needed for enlargement processing. In the apparatus provided with the motion adaptive Y/C separation circuit having a frame memory and the motion adaptive scanning line interpolation circuit having a field memory, duplex use of each of the frame memory for Y/C separation and the field memory for scanning line interpolation as an image memory for enlargement can be ensured by providing a 0.5 H delay circuit and a switch. An embodiment directed to the duplex use of each of the frame memory and field memory will now be described.

Figure 9:
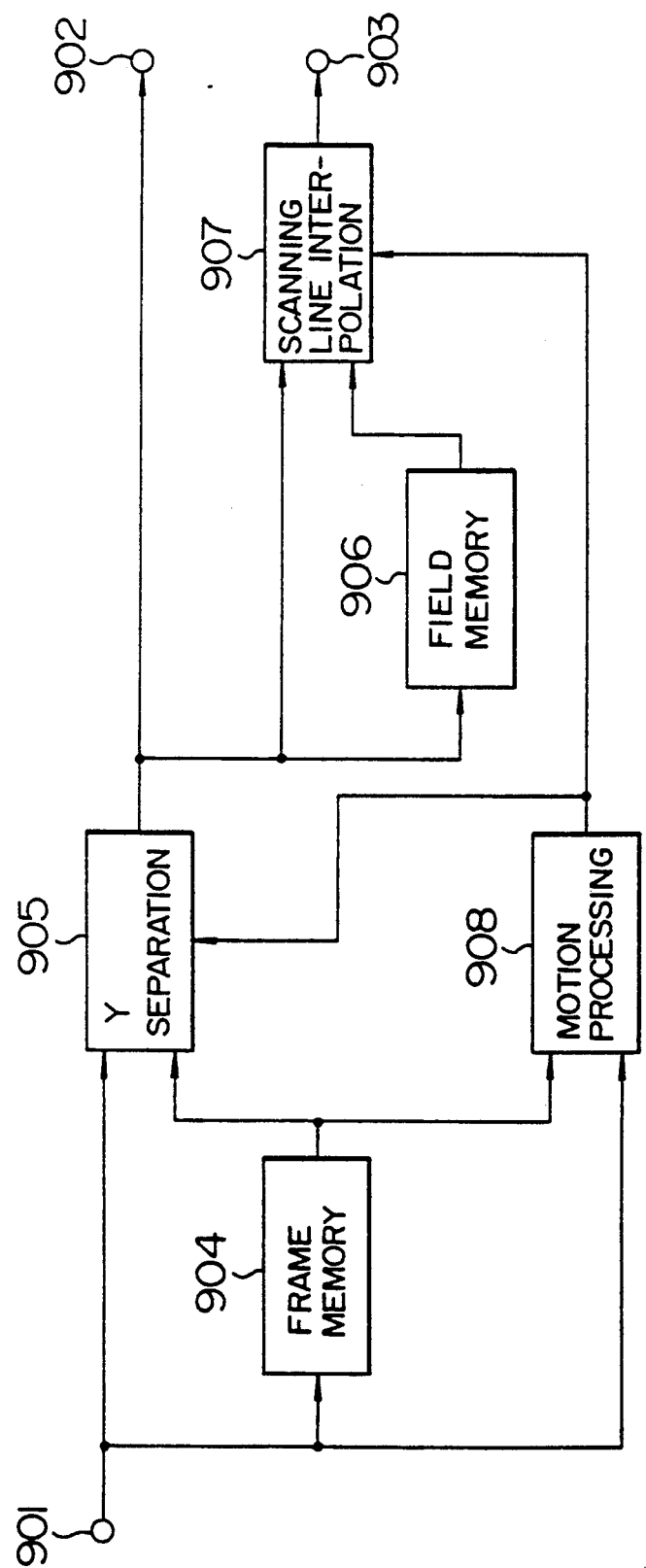
FIG. 9 is a block diagram showing a motion adaptive circuit.

FIG. 9 shows a detailed circuit construction of the real signal/interpolated signal preparation circuit 104 of FIG. 1. In FIG. 9, 901 designates an input terminal for video signal, 902 an output terminal for real scanning line signal, 903 an output terminal for interpolated scanning line signal, 904 a frame memory for one frame delaying the video signal inputted through the input terminal 901, 905 a motion adaptive Y (luminance signal) separation circuit adapted to extract a Y signal by using the video signal from the input terminal 901 and an output signal from the frame memory 904, 906 a field memory for one field delaying an output signal from the motion adaptive Y separation circuit 905, 907 a motion adaptive scanning line interpolation circuit adapted to prepare an interpolated scanning line by using output signals from the motion adaptive Y separation circuit 905 and field memory 906, and 908 a motion processing circuit which responds to the input and output signals of the frame memory 904 to detect motion and converts the detected motion into a control signal which in turn controls the motion adaptive Y separation circuit 905 and the motion adaptive scanning line interpolation circuit 907. The circuit construction in FIG. 9 is illustrated only in terms of the luminance signal system but the chrominance signal system may also be constructed similarly. The motion processing circuit 908 performs the motion detection/processing by using the input and output signals of the frame memory 904 but the motion detection/processing method is not limited thereto.

Figure 10:
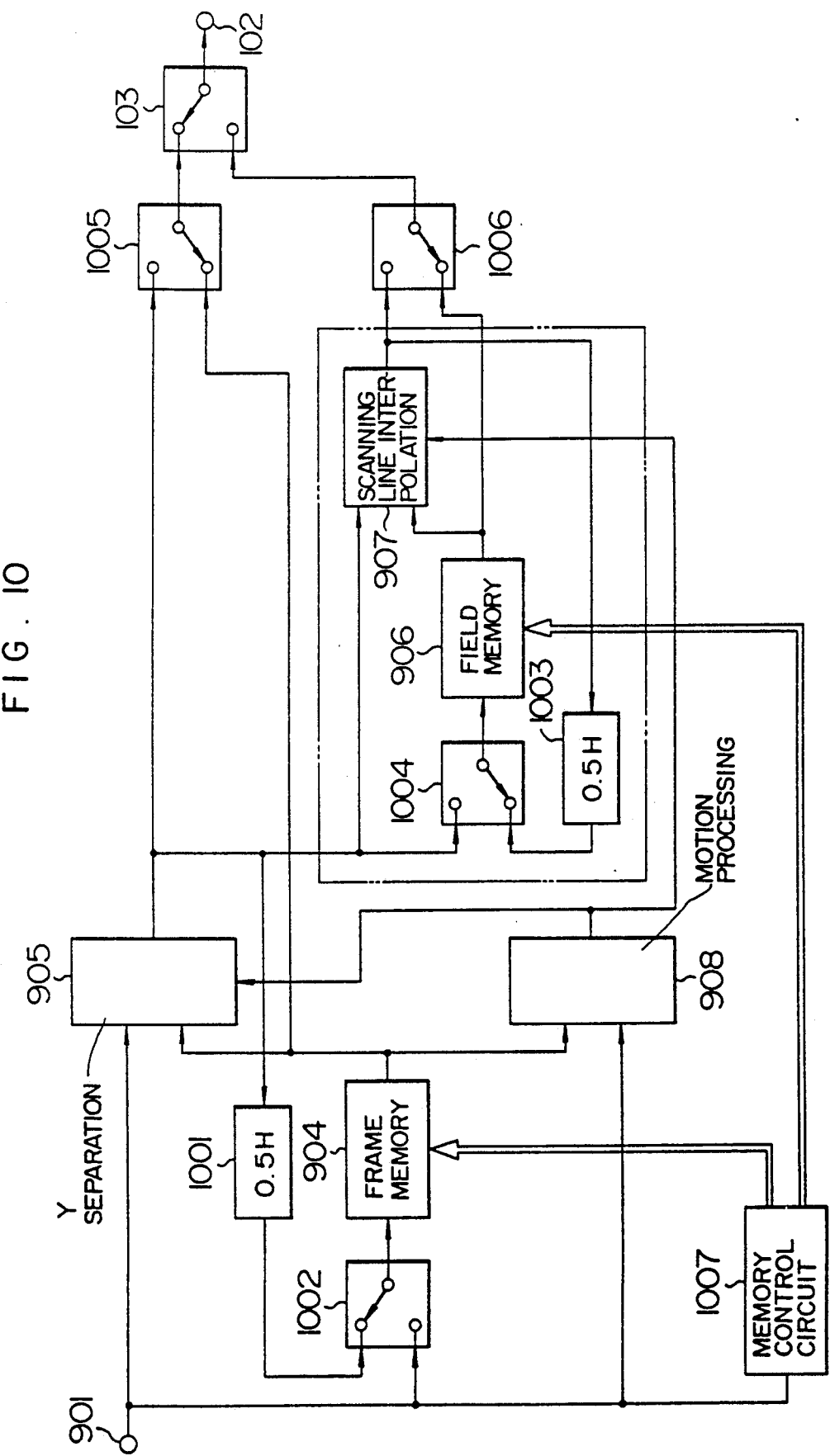
FIG. 10 is a block diagram showing another embodiment of the invention.

FIG. 10 shows an embodiment wherein the frame memory 904 and the field memory 906 are used for enlargement processing. In FIG. 10, 1001 and 1003 designate a first delay circuit for 0.5 H delaying the output signal of the frame memory 904 and a second delay circuit for 0.5 H delaying the output signal of the field memory 906, 1002 a first switch circuit for switching an output of the first delay circuit 1001 and the input video signal from the input terminal 901, 1004 a second switch circuit for switching an output signal of the second delay circuit 1003 and the output signal of the motion adaptive Y separation circuit 905, 1005 a third switch for switching the output of the motion adaptive Y separation circuit 905 and the output of the frame memory 904, 1006 a fourth switch for switching the output of the motion adaptive scanning line interpolation circuit 907 and the output of the field memory 906, and 1007 a memory control circuit adapted to prepare, from the video signal from the input terminal 901, signals for controlling the frame memory 904 and the field memory 906. Other components are identical to the components of FIG. 9.

When two or more times enlargement is carried out, the area to be displayed actually on the screen is ¼ or less of the original area of the screen, as shown in FIGS. 7A to 7E. Accordingly, in the embodiment of FIG. 10, capacity of each of the memories used for motion adaptive Y/C separation processing and motion adaptive scanning line interpolation processing is made, in the mode of enlargement, to be ¼ of that in the mode of normal processing and the remaining memory area, which is ¾, is used to play the part of the first, second, third and fourth buffer memories 105, 106, 107 and 108 of FIG. 1. The output signal of the motion adaptive Y separation circuit 905, i.e., the real scanning line signal, is fed back to the frame memory 904 through the delay circuit 1001 and first switch circuit 1002. Also, the output signal of the motion adaptive scanning line interpolation circuit 907, i.e., the interpolated scanning line signal is fed back to the field memory 906 through the delay circuit 1003 and second switch circuit 1004.

Figure 11A:
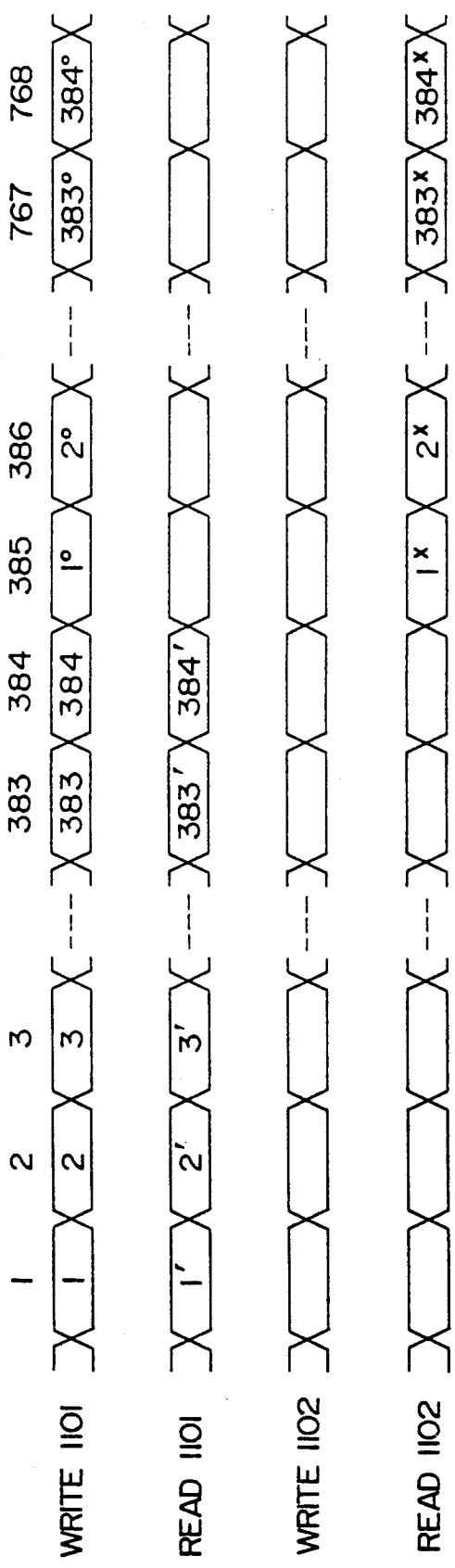
FIGS. 11A and 11B are a timing chart for data and a conceptive diagram showing used areas on a memory, respectively.
Figure 11B:
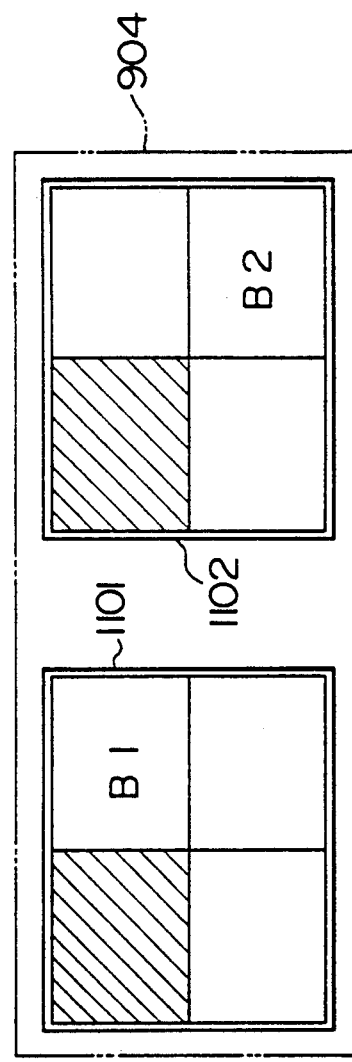

The two systems of feedback circuits and the output selection circuits 1005 and 1006 permit the duplex use of each of the memories. The operation of FIG. 10 will now be described in greater detail. FIGS. 11A and 11B are diagrams for explaining the manner of using the memory in an instance where two-times enlargement is effected at the upper left portion of the screen. In FIG. 11B, 904 represents the frame memory in FIG. 10, 1101 an illustration showing conceptually storage areas on a first field memory constituting the frame memory 904, and 1102 an illustration showing conceptionally storage areas on a second field memory constituting the frame memory 904. Hatched areas on the first and second field memories 1101 and 1102 represent memory areas used for motion adaptive processing. FIG. 11A shows accessing to the first and second field memories during a certain 1H period (on the assumption that the number of data pieces is 768), where portions described with numerals access the memories. In the example of FIGS. 11A and 11B, Y/C separation is effected using input data $(1, 2, \ldots, 384)$ and output data $(1', 2', \ldots, 384')$ to and from the field memory 1101, and calculation results $(1°, 2°, \ldots, 384°)$ are writen in an area B1 on the field memory 1101 of FIG. 11B. In this procedure, calculation for Y/C separation is carried out during the first half of 1H and the calculation results are written during the second half of 1H and therefore the 0.5H delay memory 1001 is provided in the feedback path. Signals to be enlarged correspond to data $(1^x, 2^x, \ldots, 384^x)$ which was calculated during the period of one-preceding field and has been stored in an area B2 on the field memory 1102. The switch circuit 1002 switches the motion adaptive write data $(1', 2', \ldots, 384')$ and the fed back data $(1°, 2°, \ldots, 384°)$.

Figure 12A:
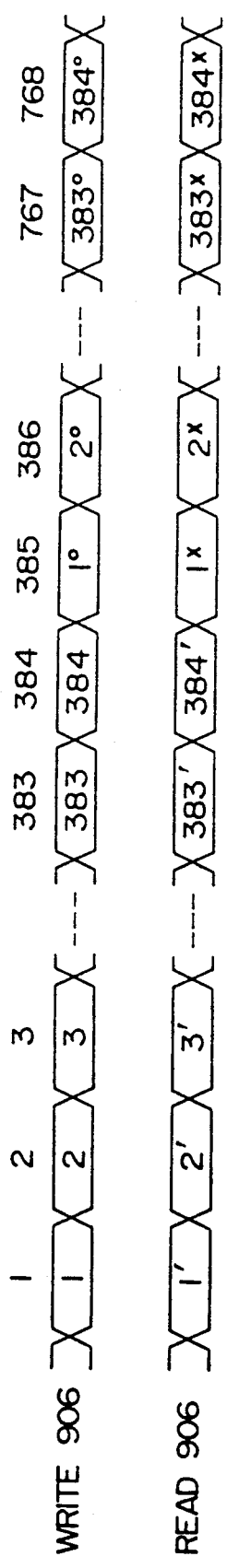
FIG. 12A is a diagram showing timings for data.
Figure 12B:
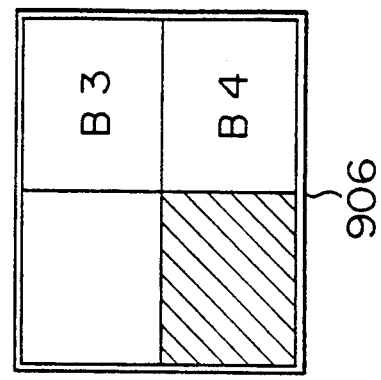
FIGS. 12B to 12D are conceptive diagrams showing used areas on the memory.
Figure 12C:
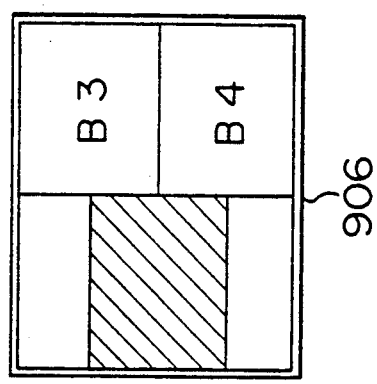
Figure 12D:
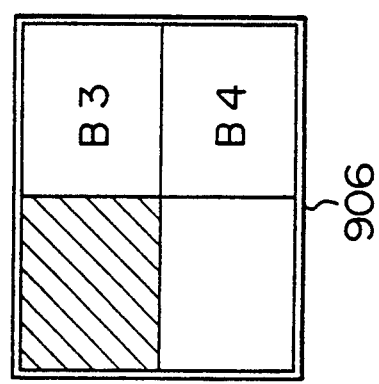

Similarly, FIGS. 12A to 12D are diagrams for explaining the manner of using the field memory 906 for motion adaptive scanning line interpolation. FIGS. 12B, 12C and 12D are diagrams showing conceptionally storage areas on the field memory 906 for motion adaptive scanning line interpolation shown in FIG. 10. An input signal $(1, 2, \ldots, 384)$ and an output signal $(1', 2',$ ..., 384') are subjected to calculation for motion adaptive scanning line interpolation and resulting data (1°, 2°, ..., 384°) is delayed through the second 0.5H delay memory 1003 shown in FIG. 10 and then written in an area B3 of FIG. 12B. On the other hand, data to be enlarged ($1^x, 2^x, ..., 384^x$) is read out of an area B4. The write data (1, 2, ..., 384) during the first half and the write data (1°, 2°, ..., 384°) during the second half are switched by the second switch circuit 1004 of FIG. 10. The areas B1, B2, B3 and B4 used as buffer memories are positioned as shown in FIGS. 11A and 11B and FIGS. 12A to 12D but the illustrated positions are not limitative so long as the capacity of ¼ field is maintained.

The foregoing description has been given of the instance where enlargement is effected at the upper left portion of the screen but enlargement at the left central portion or at the lower left portion of the screen can be achieved by displacing the timing for writing in B3 (or B4) undertaking motion adaptive processing as shown in FIG. 12C or 12D with respect to the vertical synchronization signal of the incoming signal. In this case, however, the timing for reading signals to be enlarged out of the area B4 (or B3) is always coincident with the timing for the vertical synchronization signal as in the case of normal reproduction.

Figure 13:
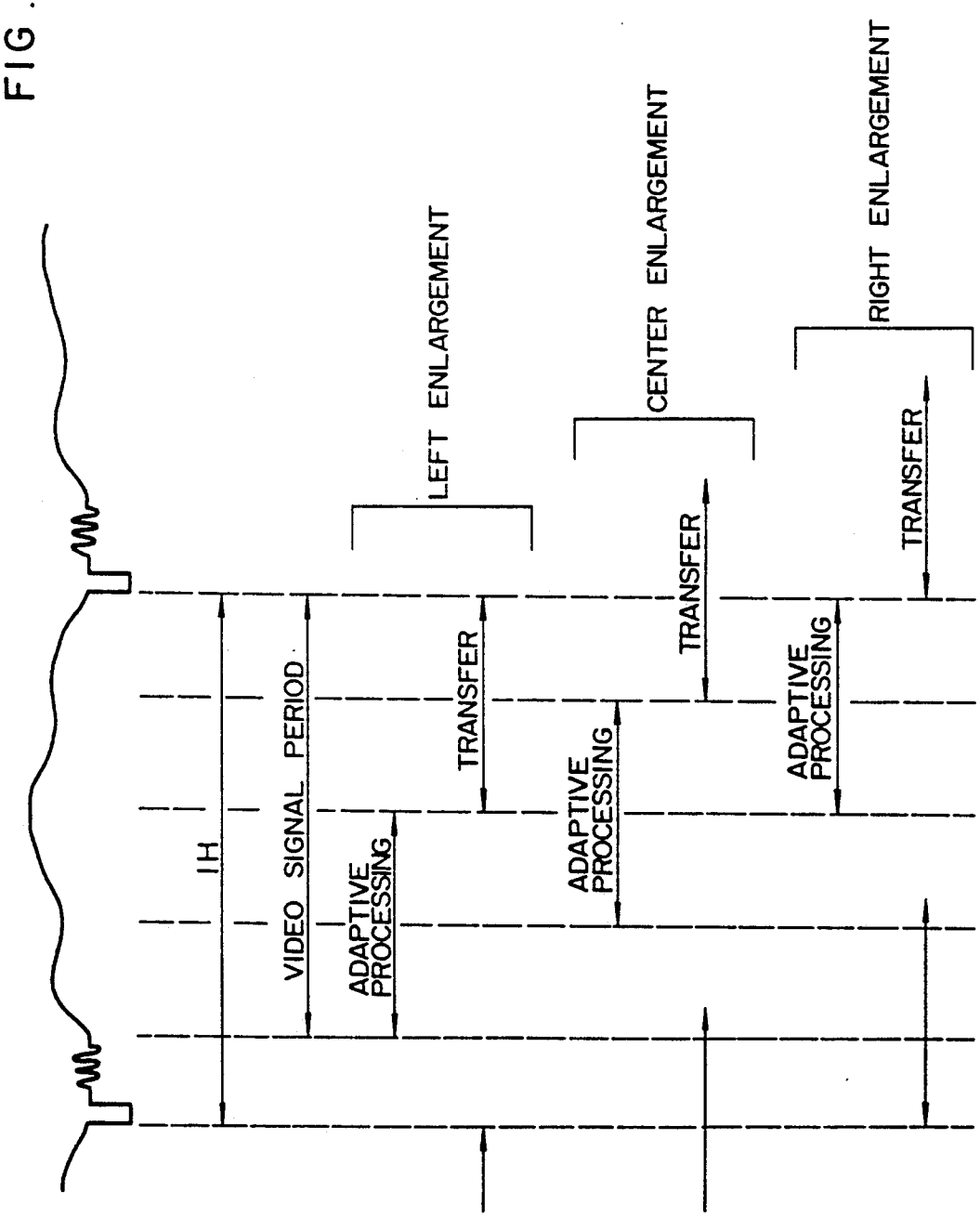
FIG. 13 is a timing chart in the case of enlargement processing.

Incidentally, the enlargement position can be changed in the horizontal direction in a manner described below with reference to FIG. 13. By shifting the periods of motion adaptive processing and signal feedback after processing in accordance with the enlargement position in the horizontal direction as shown in FIG. 13, signals to be enlarged can be stored in the memory areas B1, B2, B3 and B4 shown in FIGS. 11A and 11B and FIGS. 12A to 12D. By using the aforementioned manners of setting the enlargement position in the vertical direction and the enlargement position in the horizontal direction in combination, enlargement at a desired position can be ensured.

The third and fourth switch circuits 1005 and 1006 of FIG. 10 are switched between normal and enlargement modes so that in the normal mode, the output signals of the motion adaptive Y separation circuit 905 and scanning line interpolation circuit 907 are delivered but in the enlargement mode, the output signals of the frame memory 904 and field memory 906 are delivered. As described above, in the circuit performing the motion adaptive processing by using the frame memory, enlargement can be effected at a desired portion of the screen without using any buffer memory dedicated to enlargement.

Figure 14B:
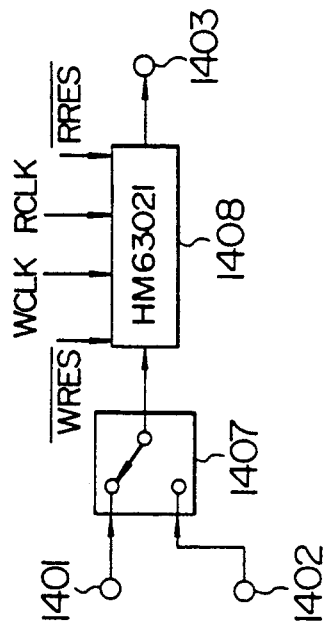
FIGS. 14A and 14B are block diagrams respectively showing progressive scan circuits.
Figure 14A:
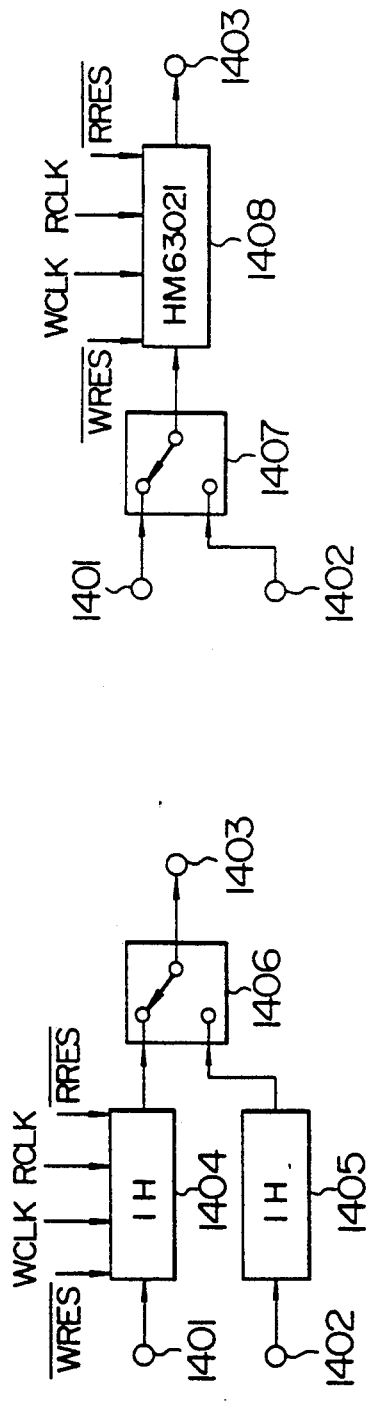
Figure 14C:
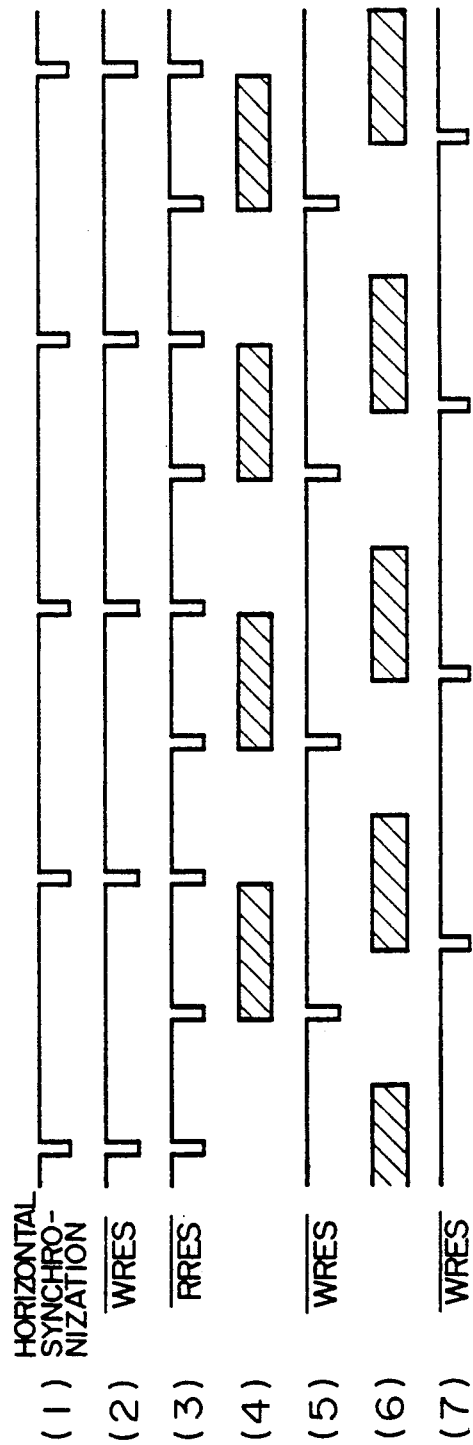
FIG. 14C is a timing chart for the operation of the progressive scan circuits.
Figure 15A:
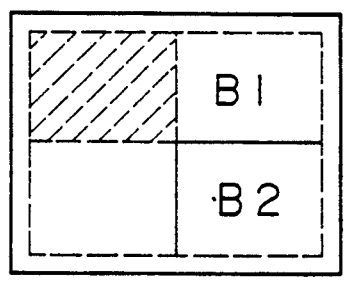
Figure 15B:
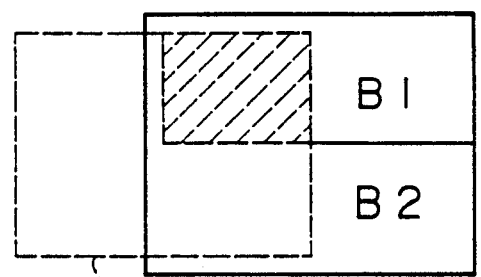
Figure 15C:
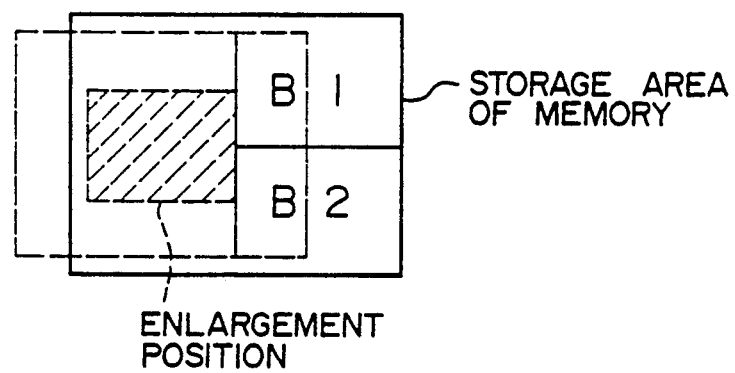
Figure 15D:
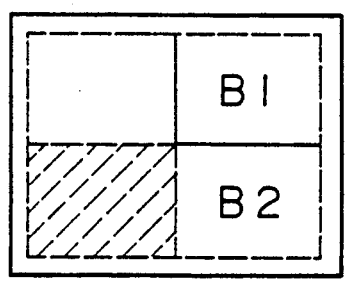
Figure 15E:
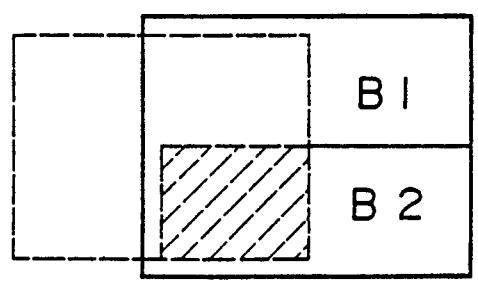

FIGS. 14A to 14C are diagrams for explaining the manner of effecting progressive scan conversion in the mode of enlargement. In FIGS. 14A and 14B, 1401 designates an input terminal for real scanning line signal, 1402 an input terminal for interpolated scanning line signal, 1403 an output terminal for progressive -7>scan signals, 1404 and 1405 first and second 1H memories, 1406 a first switch circuit for switching the real scanning line signal and the interpolated scanning line signal, 1407 a second switch circuit for multiplexing the real scanning line and interpolated scanning line pixel by pixel, and 1408 a line memory for progressive scan conversion (for example, HM 63021 manufactured by Hitachi). The difference between FIGS. 14A and 14B resides in the manner of inputting signals but the contents of processing is the same for these figures. In normal mode, addresses are reset using a reset signal for write system ($\overline{WRES}$) as shown at (2) in FIG. 14C and a reset signal for read system ($\overline{RRES}$) as shown at (3) in FIG. 14C having a frequency which is twice the frequency of the reset signal $\overline{WRES}$, and a read clock (RCLK) having a frequency which is twice the frequency of a write clock (WCLK) is inputted, thereby achieving progressive scan.

In enlargement mode such as, for example, for two-times enlargement, the frequency of the RCLK must be the same as that of the WCLK. Further, in the case of enlargement at the left side based on the manner of FIG. 10, since delivery of signals to be enlarged and application of the delivered signals through the input terminals 1401 and 1402 occur at hatched portions shown at (4) in FIG. 14C, timings for generation of the WRES are settled as shown at (5) in FIG. 14C. Similarly, in the case of enlargement at the central portion, the timings are settled as shown at (7) in FIG. 14C. In this manner, switching of the WRES and that of the RCLK are carried out in accordance with the magnification and the location of enlargement to permit accurate enlargement.

The difference in signal processing depending on the location of enlargement is simplified as will be described below with reference to FIGS. 15A to 15E and FIGS. 16A to 16D. Illustrated in FIGS. 15A to 15E are relations of portions to be enlarged of pictures to storage areas on the memory. In FIGS. 15A to 15E, an incoming video signal is illustrated as defined by a dotted-line block and an image area subjected to enlarged display is indicated by a dotted-line hatched portion. A storage area of the field memory is illustrated as defined by a thick solid-line block and buffer areas on the field memory are indicated by B1 and B2. It is to be noted that FIGS. 15A to 15E shows only the manner of using the memory for scanning line interpolation and the memory for Y/C separation may be used in a similar manner. As is clear from FIGS. 15R to 15E, the left half of the field memory is used for motion adaptive processing and results are transferred to the B1 or B2 area on the right. To explain by referring to, for example, FIG. 15E, the dotted-line incoming picture area can be displaced from the memory storage area defined by the thick solid-line block by changing the position of the horizontal synchronization for memory control. Transfer to the B1 area starts at the time that the incoming signal ½ V proceeds in the vertical direction. In this case, reading signals from the B2 area is started concurrently with V synchronization of the incoming signal. Accordingly, there is no need of changing the V synchronization position in the display system.

FIGS. 16A to 16D are illustrative of the manner of enlargement from a different viewpoint. FIG. 16A shows an incoming video signal, FIG. 16B shows write positions on the memory, FIG. 16C shows signals read out of the memory, and FIG. 16D shows results of enlargement. FIGS. 16A to 16D show the operation of the scanning line interpolation circuit. In this instance, the incoming signal is representative of a moving picture and for example, D4 is selected from an incoming D4 signal and a signal C4 read out one field earlier and again written in the memory. The written D4 signal is expanded, one field later, in the vertical direction, again read out and then expanded in the horizontal direction by means of the line memory, thereby providing an enlarged image as shown in FIG. 16D. Through the above procedure, an image at any position, regardless of moving picture or still picture, can be enlarged.

Figure 17:
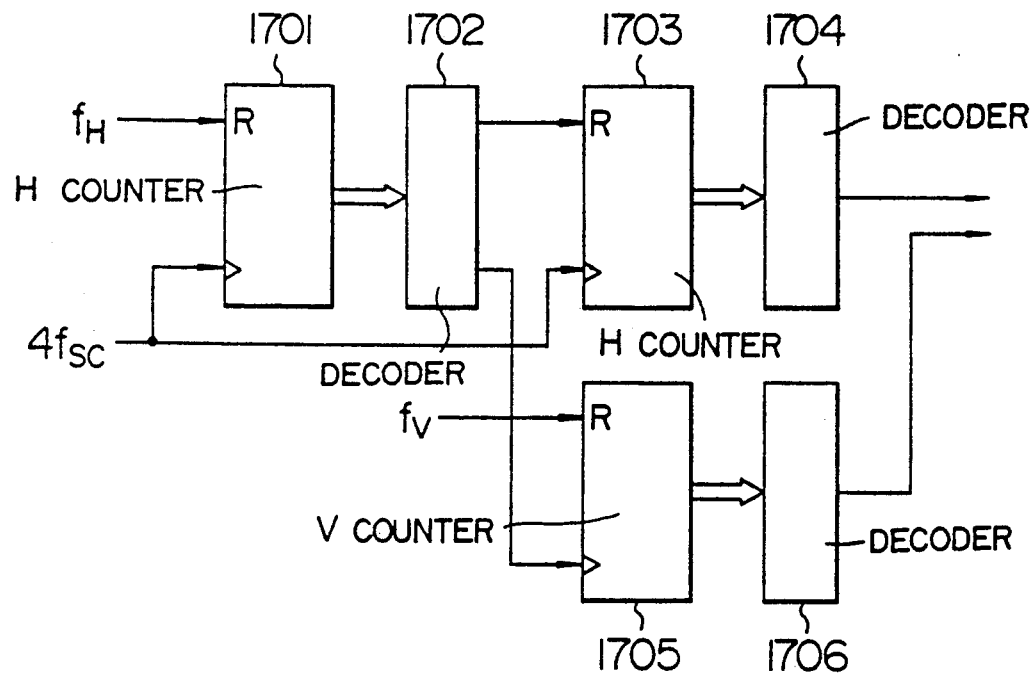
FIG. 17 is a block diagram of a memory control unit.

FIG. 17 illustrates an example of the construction of part of the memory control circuit 1007 shown in FIG. 10, and 1701 designates a H counter synchronous with the incoming horizontal synchronization signal, 1702, 1704 and 1706 horizontal or vertical decoders, and 1703 and 1705 a H counter under the command of new horizontal synchronization and a V counter. As shown in FIG. 17, the memories 904 and 905 can be controlled by changing the synchronization signal positions of the counters 1703 and 1705 for memory control in accordance with the enlargement position. Thus, in accordance with the embodiment described so far with reference to FIGS. 10 to 17, duplex use of each of the memories for video signal processing can be ensured for enlargement processing.

Figure 18:
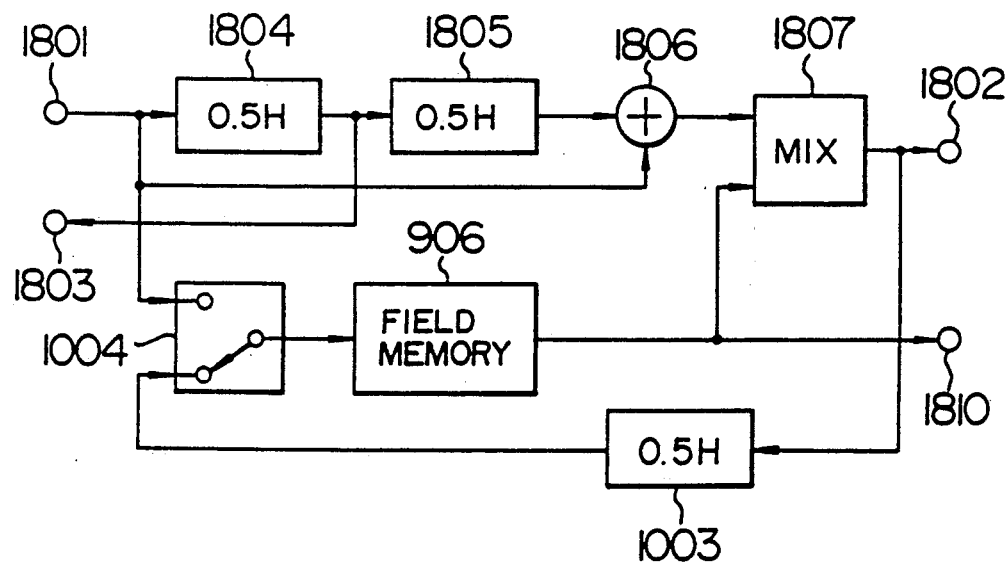
FIG. 18 is a block diagram showing still another embodiment of the invention which is relevant to FIG. 10.

FIG. 18 shows still another embodiment of the invention directed to details of a dotted-line block shown in FIG. 10. In FIG. 18, 1801 an input terminal for the output signal of the motion adaptive Y separation circuit 905 of FIG. 10, 1802 an output terminal for the scanning line interpolation circuit 907 of FIG. 10, 1803 an output terminal of the first 0.5H delay circuit 1001 in FIG. 10, 1810 an output terminal of the field memory 906, 1804 and 1805 third and fourth 0.5H delay circuits, 1806 an adder for preparing interpolated scanning lines for moving picture, and 1807 a mixer for mixing an interpolated scanning line signal for moving picture and an interpolated scanning line signal for still picture. Other components are the same as components in the embodiment of FIG. 10. In the circuit of FIG. 18, the interpolated scanning line signal for moving picture produced from the adder 1806 and the interpolated scanning line signal for still picture produced from the field memory 906 are mixed at the mixer 1807 and delivered out. In order to prepare the interpolated scanning lines for moving picture, the signal must be 1H delayed using the line memories 1804 and 1805. In this embodiment, the line memory is divided into two of the third and fourth 0.5H delay circuits 1804 and 1805, and the third 0.5H delay memory 1804 plays the part of the first 0.5 delay circuit of FIG. 10. Because of the duplex use of this memory, memory capacity can be reduced by 0.5H.

Although any of the foregoing embodiments have been described by referring to the case of two-times enlargement, N-times enlargement can be realized easily by changing the manner of controlling reading the memory. For example, an invention disclosed in Japanese Patent Application No. 63-060589 by the present inventors field Mar. 16, 1988 may be utilized.

For convenience of explanation, the 0.5H delay memories 1001, 1003 and 1804 are described as providing a delay which is half the horizontal scanning period but they are not always required to have capacity for providing a delay which is accurately half the horizontal scanning period. Practically, such capacity as being half the horizontal storage capacity of the field memory and enough to store an image stored in the left half into the right half is satisfactory.

According to the invention, by applying the signal processing to the video signal, a desired position of an image can be enlarged and displayed with high quality.

Further, in the apparatus including the video signal processing circuit for performing frame processing, the high-quality enlargement function can be realized without adding an additional memory.

What is claimed is:

1. A video signal processing circuit for receiving a video signal which is being subjected to interlace scanning, storing the video signal in a memory and processing the video signal to provide an enlarged video signal, comprising:

enlarged-image scanning line preparation means for producing, from said received video signal, a new video signal including the received video signal and an interpolated scanning line signal which is produced by motion-adaptive interpolation from said received video signal; and enlargement and memory processing means, including said memory, for storing an output of said enlarged-image scanning line preparation means, and reading from said memory said stored video signal at a read period different from a write period at which an image element signal of said received video signal is written to produce said enlarged video signal.

2. A video signal processing circuit according to claim 1, wherein said enlarged-image scanning line preparation means includes:

motion detection means for detecting motion in said received video signal to produce a motion signal;

motion adaptive scanning line interpolation means responsive to said motion signal for generating said interpolated scanning line signal from the output of said memory in accordance with said motion signal from said motion detection means; and combiner means for combining an intra-field interpolation signal and an inter-field interpolation signal in accordance with the motion signal from the motion detection means to produce said enlarged video signal.

3. A video signal processing circuit according to claim 1, further comprising:

a progressive scan conversion circuit connected to the input or the output of said enlargement and memory processing circuit, thereby permitting enlarged display of a picture under non-interlaced scanning.

4. A video signal processing circuit according to claim 1, further comprising:

field delay means for delaying the enlarged video signal by one or more fields with respect to the received video signal.

5. A video signal processing method of providing an enlarged video signal based on a video signal which is being subjected to interlaced scanning, comprising the steps of:

receiving said video signal;

producing an interpolation scanning line signal by motion-adaptive scanning interpolation from said received video signal;

collecting said received video signal and said interpolation scanning line signal to produce a new video signal; and storing said new video signal in said memory and reading said stored video signal at a read period different from a write period at which an image element signal of said received video signal is written to produce the enlarged video signal.

6. The method according to claim 5, wherein said interpolation scanning line signal producing step comprises the steps of:

detecting motion in the received video signal under interlaced scanning to produce a motion signal; and performing scanning line interpolation on the motion signal to produce the interpolation scanning line signal.

7. The method according to claim 5, further comprising the step of:

delaying the enlarged video signal by one or more fields with respect to the received video signal.

* * * * *